United States Patent [19]

Hutson et al.

[11] Patent Number: 4,618,178

[45] Date of Patent: Oct. 21, 1986

[54] HAND HELD VACUUM ACTUATED PICKUP INSTRUMENT

[75] Inventors: Clifford L. Hutson, 1860 Idlewood Rd., Glendale, Calif. 91202; Leonidas C. Miller, Monterey Park, Calif.

[73] Assignee: Clifford L. Hutson, Glendale, Calif.

[21] Appl. No.: 742,472

[22] Filed: Jun. 7, 1985

[51] Int. Cl.[4] .............................................. B25J 15/06

[52] U.S. Cl. .................................................. 294/64.1

[58] Field of Search .............................. 294/64.1-64.3; 29/743, 758; 15/419, 421; 251/145, 298, 301, 303; 269/21; 279/3; 604/119, 129

[56] References Cited

U.S. PATENT DOCUMENTS

| | | | |
|---|---|---|---|
| 2,916,059 | 12/1959 | Wong | 294/64.1 |
| 3,071,402 | 1/1963 | Lasto et al. | 294/64.1 |
| 3,843,183 | 10/1974 | Hutson | 294/64.1 |
| 3,940,172 | 2/1976 | Hutson et al. | 294/64.1 |
| 4,536,180 | 8/1985 | Johnson | 604/119 X |

FOREIGN PATENT DOCUMENTS

| | | | |
|---|---|---|---|
| 248952 | 7/1969 | U.S.S.R. | 294/64.1 |

*Primary Examiner*—Johnny D. Cherry
*Attorney, Agent, or Firm*—Paul A. Weilein

[57] ABSTRACT

A hand held, vacuum actuated pickup instrument and method of operation are disclosed for an instrument of the type including an elongated body with a pickup attachable at one end and a tail stock at the other end for connection with a vacuum source. According to the present invention, a valve is arranged within the elongated body for selectively venting an axially extending passage connecting the pickup with the tail stock, the valve including a valve element overlying a vent opening, a lever portion attached to the valve element and a fulcrum providing for pivotal movement of the valve element. A restrictive opening is formed between the axially extending opening and the tail stock to further facilitate operation of the instrument.

11 Claims, 9 Drawing Figures

HAND HELD VACUUM ACTUATED PICKUP INSTRUMENT

BACKGROUND OF THE INVENTION

The present invention relates to a vacuum actuated pickup instrument and a method of operating such an instrument and more particularly to such an instrument and method of operation adapted for use in handling relatively delicate or fragile objects.

Many different types of vacuum actuated pickup instruments have been provided in the prior art for handling a variety of objects. Some of these instruments are particularly contemplated for handling microelectronic wafers or chips of a type adapted for having printed circuitry or other components imposed thereupon. Such wafers or chips are relatively delicate or fragile and require a number of different operations to complete their construction.

With larger sizes of such chips and wafers being employed to increase capacity and productivity, the hazard of breakage is of even greater concern because of the greater value of the wafers or chips.

In many operations, automated equipment is employed for handling the wafers. However, even in such automated applications, many operations still require individual handling of the wafers and vacuum actuated instruments of the type provided by the present invention have been found particularly suitable for this purpose. Generally, such pickup instruments commonly include valve means for regulating the initiation and/or termination of vacuum conditions in a pickup head in order to selectively engage and release objects to be moved by the instrument.

One of the simplest valve mechanisms includes a flexible tube which can be pinched manually or by various valve means to terminate a vacuum condition. With such an instrument, the vacuum may again be initiated simply by releasing and allowing the flexible tube to expand and re-establish the vaccum.

Another type of valve arrangement includes a vent opening along a vacuum passage so that an operator may either close the vent with a finger to develop a vacuum or remove his finger to vent the passage and terminate vacuum conditions.

Somewhat more complex valve arrangements have also been employed in order to better adapt the instrument for use with delicate articles such as semi-conductor wafers of the type referred to above. For example, Lasto et al U.S. Pat. No. 3,071,402 discloses different embodiments of vacuum operated probe tools having either a slide type or push-button type valve for initiating and terminating vacuum conditions.

Furthermore, a number of patents have issued to one of the inventors of the present invention concerning similar vacuum actuated instruments. For example, U.S. Pat. No. 3,843,183 issued to Clifford L. Hutson discloses such an instrument including a slide valve movable to a first position to connect a nozzle with a vacuum source, a second position to disrupt communication between the nozzle and the vacuum source while maintaining the vacuum condition in the nozzle, and a third position to vent the nozzle.

U.S. Pat. No. 3,940,172 issued to Clifford L. Hutson et al also discloses a vacuum actuated instrument including a similar slide valve together with means for rotating a nozzle or tip of the instrument together with an object picked up by the instrument.

U.S. Pat. No. 4,050,729 also issued to Hutson dealt with similar vacuum actuated instruments while disclosing a triangular housing forming a preferred embodiment of a vacuum attachment nozzle or head for engaging objects such as semiconductor chips or wafers. Although the present invention does not deal with the particular configuration of the vacuum nozzle, it is noted that a vacuum attachment nozzle of the type disclosed in the above reference could also be employed with the instrument of the present invention.

In any event, a wide variety of such instruments is available in the prior art. However, because of the complexity and fragility of various objects requiring handling by such instruments, there has been found to remain a continuing need for improvement in such instruments and their capabilities. In addition, although the invention is described below particularly in connection with the handling of semi-conductor wafers of the type referred to above, it is noted that the vacuum actuated pickup instrument of the present invention may also be employed for handling objects of a wide variety. In particular, the instrument of the present invention is adapted for handling any objects, particularly small or fragile articles requiring substantial manipulation and having a surface adapted for engagement by a vacuum nozzle of the type employed with such instruments.

SUMMARY OF THE INVENTION

It is therefore an object of the present invention to provide a vacuum actuated pickup instrument and method of operation for such an instrument suitable for use in applications of the type summarized above. In particular, the invention contemplates that the instrument be of a hand held type to facilitate manual handling of various objects such as semi-conductor wafers, chips and the like.

It is a further object of the invention to provide a vacuum actuated pickup instrument of the type including an elongated body with a vacuum actuated pickup means at one end and a tail stock means at the other end of the body for connection with a vacuum source, valve means being arranged within the elongated body and comprising an axially extending passage for communication the pickup means with the tail stock means, a vent opening arranged in communication with the axially extending passage and a spring-loaded valve including a valve element overlying the vent opening, a lever portion attached to the valve element and fulcrum means providing for pivotal movement of the valve element by the lever portion to facilitate manipulation of the instrument.

It is a further related object of the invention to provide such an instrument wherein the spring load on the valve member normally biases the valve element into closing engagement with the vent opening for producing a vacuum condition in the pickup means, the valve member being operable preferably in manual fashion for selectively terminating the vacuum condition.

It is yet another object of the invention to provide such a vacuum actuated pickup instrument and method of operation wherein the instrument includes an elongated body with a vacuum actuated device at one end and a tail stock means at the other end for connection with a vacuum source, a valve means being arranged in the elongated body and comprising an axially extending passage for connecting the pickup device with the tail stock and valve means for selectively establishing and terminating a vacuum, a restrictive opening being formed between the axial passage and the tail stock to further facilitate operation of the instrument.

It is a further related object of the invention to provide such an instrument and method of operation wherein the restrictive opening and vent are sized relative to each other for assuring termination of vacuum conditions in the pickup means upon operation of the valve to vent the axial passage.

It is another related object of the invention to provide such an instrument and method of operation wherein the restrictive opening is variable in size, for example, by being formed in an element which is replaceably mounted on the elongated body.

Yet a further related object of the invention is to provide such an instrument and method of operation wherein the restrictive opening is sized to cause a delay in the rate at which pressure conditions in the pickup device are balanced with pressure conditions in the tail stock means.

Additional objects and advantages of the present invention are made apparent in the following description having reference to the accompanying drawings, the embodiments disclosed in the drawings and described below being set forth herein only for purposes of example.

DESCRIPTION OF THE PREFERRED EMBODIMENT

Figures 1, 2, 3, 4, 5:
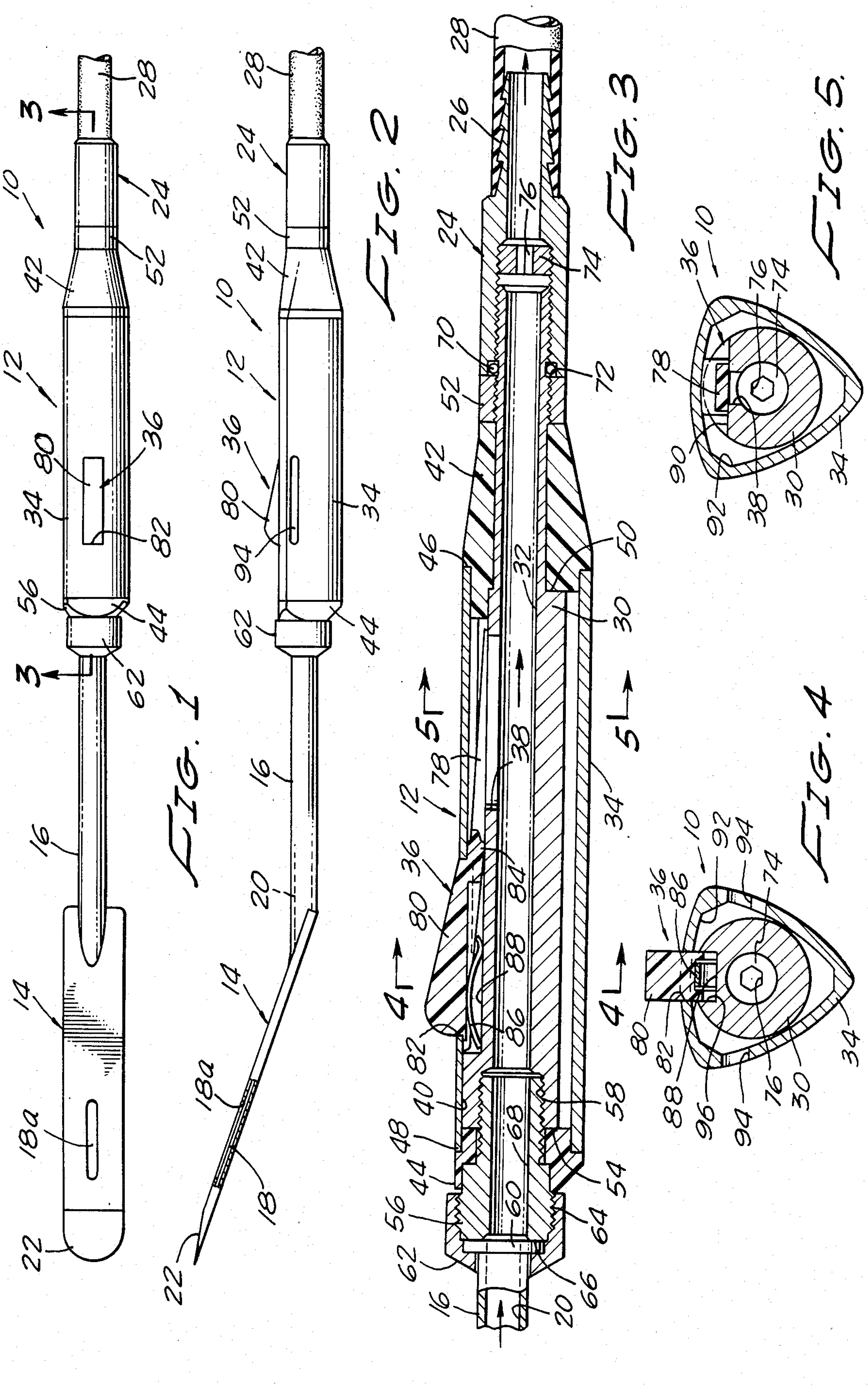
FIG. 1 is a top or plan view of a vacuum actuated pickup instrument constructed according to the present invention and including an exemplary type of pickup blade or device attached thereto.
FIG. 2 is a side view in elevation of the instrument of FIG. 1.
FIG. 3 is an enlarged axially sectioned view taken along section line 3—3 of FIG. 1 to better illustrate construction of a valve within the instrument body, the valve normally being biased to a closed position to permit development of vacuum conditions within the instrument body and within the pickup blade.
FIG. 4 is a transverse sectioned view taken along section line 4—4 of FIG. 3 to better illustrate one portion of the valve.
FIG. 5 is similarly a transverse sectioned view taken along section line 5—5 of FIG. 3 to better illustrate another portion of the valve.
Figure 6:
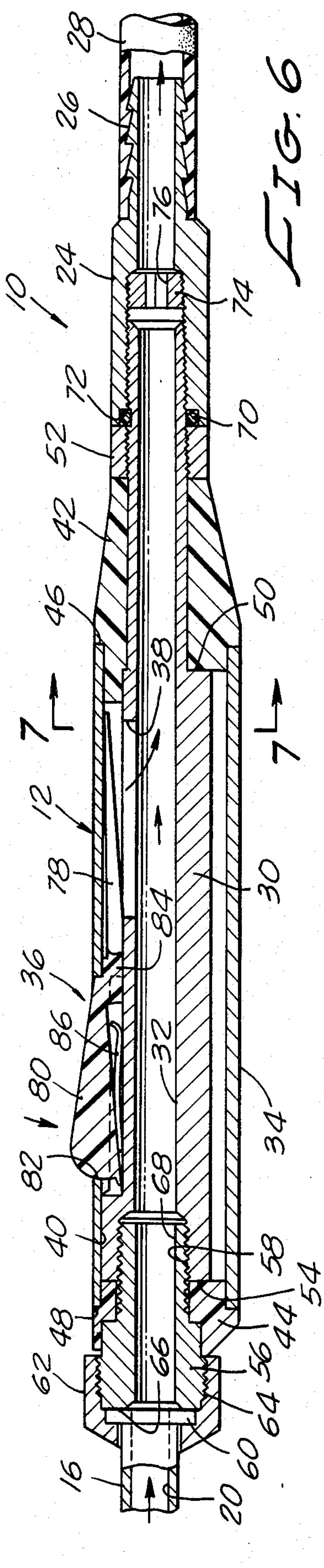
FIG. 6 is an axially sectioned view similar to FIG. 3 but with the valve means being in an open position to permit venting of the interior of the instrument body and the pickup blade for terminating vacuum conditions therein.
Figure 8:
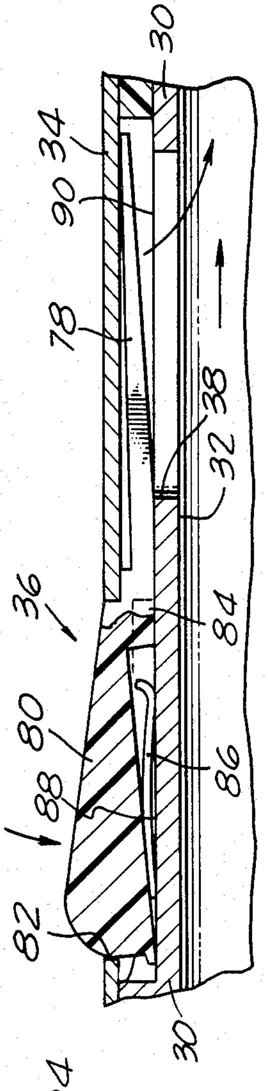
FIG. 8 is an enlarged fragmentary view similar to a portion of FIG. 6 for better illustrating construction of the valve means.
Figure 7:
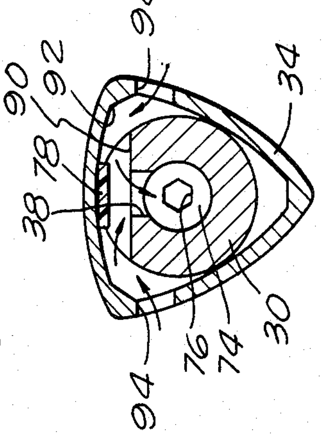
FIG. 7 is a transverse sectioned view taken along section line 7—7 of FIG. 6 to better illustrate venting action permitted by operation of the valve.
Figure 9:
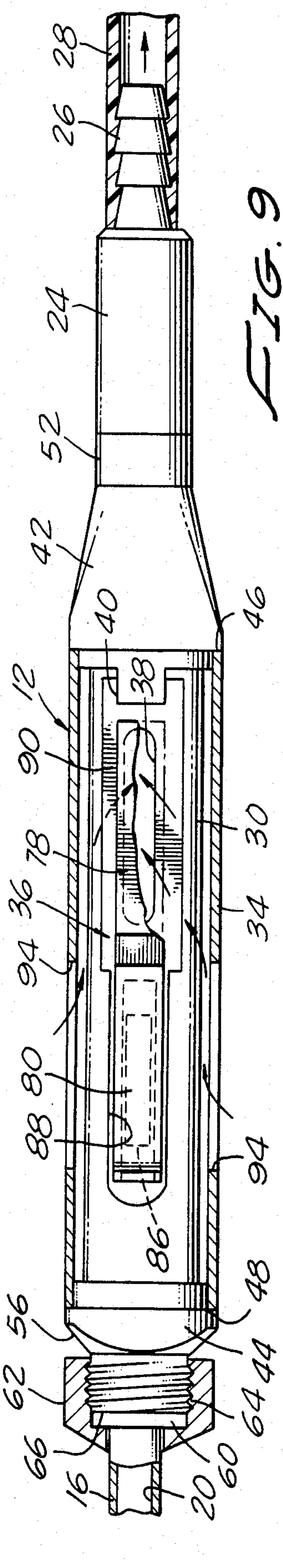
FIG. 9 is also an enlarged plan view of a portion of the instrument with the valve means being in an open position similarly as in FIG. 8, portions of the instrument being shown in section to better illustrate construction and operation of the instrument.

Referring now to the drawings and particularly to FIGS. 1-3, a vacuum actuated pickup instrument of the type contemplated by the present invention is generally indicated at 10. The instrument 10 includes a body portion 12 shaped to facilitate hand held use of the instrument. A vacuum pickup blade or device 14 is mounted on one end of the body portion 12 by means of a tubular extension 16.

As noted above, the instrument 10 is adapted for use with a variety of pickup blades or devices and that illustrated at 14 is generally shown herein only for purposes of example. In any event, the pickup blade 14 is formed with a vacuum pickup cavity 18 in communication with the body portion 12 of the instrument through an opening 20 extending along the pickup blade 14 and tubular extension 16. The blade 14 is provided with a slot or opening 18a in communication with the cavity 18.

As may also be seen, particularly in FIGS. 1 and 2, the exemplary pickup blade 14 is preferably arranged at an angle relative to the tubular extension 16 and includes a tapered end portion 22 to further facilitate handling of various objects such as semi-conductor wafers and chips.

Referring particularly to FIG. 3, a tail stock element 24 is connected to the opposite end of the body portion 12 from the pickup blade 14. The tail stock element 24 is formed with a tapered portion 26 having concentric beads or knurling formed along its length to facilitate attachment to a vacuum source (not shown) by means of flexible tubing as illustrated at 28.

Internal construction of the body portion 12 of the instrument may be best seen in FIG. 3 and includes a tubular element 30 forming an axially extending passage 32 for communicating the pickup blade 14 with the vacuum source through the tail stock 24.

As is illustrated in FIG. 3 and may also be seen with reference to FIGS. 1 and 2, the tubular element 30 is arranged within an external sheath or housing 34 having a triangular configuration in cross section, as illustrated in FIGS. 4 and 5, to facilitate manual handling of the instrument.

The sheath 34 also serves to position and expose a valve unit 36 which is described in greater detail below but functions generally to open or close a vent opening 38 formed by the tubular element 30 in communication with the axially extending passage 32. The tubular element 30 is shaped to abut the sheath 34, for example as indicated at 40, in order to assure proper alignment of the valve unit 36 with the vent opening 38 (see FIG. 3).

The sheath 34 is mounted about the tubular element 30 in a manner which may also be best seen with reference to FIG. 3. Annular adapters 42 and 44 preferably formed from plastic or other resilient material are respectively arranged at opposite ends of the tubular element 30 to engage the corresponding ends of the sheath 34 at 46 and 48.

The adapter 42 arranged at the tail stock end of the body 12 is compressed against the sheath 34 and against an annular shoulder 50 on the tubular element 30 by means of a collar 52 which is threaded onto the adjacent end of the tubular element 30.

The adapter 44 is similarly urged against the end 48 of the sheath 34 and against an annular end 54 of the tubular element 30 by means of another collar or nut 56.

Whereas the collar 52 at the tail stock end of the body 12 encompasses the adjacent end of the tubular element 30, the collar or nut 56 extends axially through the adapter 44 and threads internally into a counterbore 58 of the tubular element 30.

The tubular extension 16 of the pickup blade 14 is preferable formed with an annular flange 60 which nests within a retainer 62 threaded onto the collar or nut 56 as indicated at 64. Thus, the retainer 62 facilitates replacement of the pickup blade 14 on the body 12 to adapt the instrument for use in different applications. In addition, the annular flange 60 and collar or nut 56 are configured to provide a seal at 66.

With the arrangement illustrated at the left hand of the body portion 12 as viewed for example in FIG. 3, the collar or nut 56 is also formed with an axial passage 68 for communicating the opening 20 in the tubular extension 16 with the axially extending passage 32 in the tubular element 30.

The plastic or resilient adapter 44 also serves to form a seal between the collar or nut 56 and the tubular element 30. Similarly, a seal is formed between the other end of the tubular element 30 and the tail stock 24 by means of an O-ring 70 positioned in an annular groove 72 for compression between the tail stock 24 and the adjacent collar 52.

Thus, with the arrangement for example in FIG. 3, the axially extending pasage 32 tends to provide continous communication between the pickup blade 14 and the tail stock 24. With a vacuum source being connected to the tail stock 24 by the tubing 28, vacuum conditions are readily developed within the axially extending passage 32 and within the pickup blade 14 as long as the valve unit 36 remains closed.

The construction and operation of the valve unit 36 is hereinafter described in greater detail. However, it is initially noted that an insert 74 is threaded into the tail stock 24 adjacent the end of the tubular element 30 and forms a restrictive opening 76. The opening 76 is hexagonally shaped as may be seen for example in FIGS. 4 and 5 to facilitate insertion and removal or replacement of the insert 74 within the tail stock 24. The function of the insert 74 and critical sizing of the restrictive opening 76 is described in greater detail below.

Turning now to the valve unit 36, its construction and mode of operation may be best seen by combined reference to FIGS. 3–9. The vent opening 38 is formed as a substantially elongated slot in order to permit ample air flow into the axially extending passage 32 when the valve unit 36 is open.

The valve unit 36 includes an elongated valve element or closure 78 arranged in overlapping relation to the vent 38 as illustrated in FIGS. 3 and 5. A lever portion 80 is connected to one end of the valve element 78 with the lever portion 80 being arranged within an opening 82 formed in the sheath or housing 34. Thus, the opening 82 serves to expose the lever portion 80 and make it available for manipulation of the valve unit 36 while at the same time serving to maintain the valve unit 36 in proper alignment with the vent opening 38.

A central portion of the valve unit 36 intermediate the valve element 78 and lever portion 80 forms a fulcrum as indicated at 84. With the central portion of the valve unit 36 being captured between the sheath 34 and the tubular element 30, the fulcrum 84 provides for pivotal movement of the valve element 78 by the lever 80.

A compression leaf spring 86 is captured in a chamber 88 formed between the lever portion 80 and the tubular element 30 in order to bias the valve unit 36 into a position as illustrated in FIG. 3 with the valve element 78 closing the vent opening 38.

Referring also to FIG. 5, the tubular element 30 is formed with a chordal flat surface 90 generally coextensive with the elongated valve element 78 to provide better seating engagement of the valve element 78 and also to assure free communication of the vent opening 38 with the interior 92 of the sheath 34. Opposed vent openings 94 are also formed in the sheath 34 and are in communication with the vent opening 38 through internal passages 92 formed by the sheath.

Referring to FIG. 4 in combination with FIG. 3, another portion of the tubular element 30 forms an elongated recess 96 for forming the chamber 88 within which the spring 86 is arranged and also to capture the lever portion 80 of the valve unit 36 to further assure that the valve element 78 remains in proper alignment with the vent opening 38.

With the combination of the instrument as described above and with the valve unit 36 in its normally closed position as illustrated for example in FIGS. 3–5, the axially extending passage 32 serves to develop vacuum conditions within the pickup blade 14 by communicating it with the tail stock 24 and with a vacuum source connected with the tail stock by means of the tubing 28.

When the valve unit 36 is operated or shifted into an open position as illustrated in FIGS. 6–9, the valve element 78 is raised upwardly exposing substantially the full length of the vent opening 38. With the valve unit in that position, substantial air flow is permitted to enter into the axially extending passage 32 through the vent openings 94, the interior passages 92 of the sheath 34, across the flat surface 90 of the tubular element 30 and finally through the vent opening 38. Because of the relatively large size of the elongated vent opening 38 and the free communication or air flow permitted through the instrument body as represented by the arrows in FIG. 9, vacuum conditions may be readily overcome within the axially extending passage 32 and within the pickup blade 14 in order to release an object previously secured to the pickup blade 14 by vacuum conditions therein. In this respect, an object to be picked up by the blade 14 is not illustrated. However, such objects may readily be seen, for example, by reference to U.S. Pat. No. 4,050,729 which was also noted above.

In order to further facilitate operation of the instrument and to adapt it for use in a number of different applications, the restrictive opening 76 formed by the insert 74 is preferably sized for causing a delay in the rate at which pressure conditions within the pickup blade 14 are equalized or balanced with pressure conditions within the tail stock 24 and in the tubing 28 connected with the vacuum source. Stated otherwise, the restrictive opening 76 is sized relative to the vent opening 38 in order to assure termination of vacuum conditions within the pickup blade 14 upon actuation of the valve unit 36, particularly when the instrument 10 is being employed for handling of relatively light objects. In such situations, the combination referred to above assures substantial elimination of vacuum conditions within the pickup blade 14 in order to facilitate release of the relatively light objects or the like.

As noted above, the restrictive opening 76 is adjustable or variable, for example, by replacement of the insert 74 with another insert (not shown) having a restrictive opening of different size. In this manner, the instrument 10 may be readily adapted for use in a variety of applications. In this regard, it is again noted that the versatility of the instrument 10 is further enhanced by the ability to exchange or replace the pickup blade 14.

The method of operation for the instrument of the present invention is believed apparent from the preceding description. However, the method of operation according to the present invention is briefly described below in order to assure a complete understanding thereof.

In operation, an object (not shown) may be engaged by the instrument with the valve unit 36 in its normally biased position so that the vent opening 38 is closed. Under those conditions and with a vacuum source connected to the tail stock 24 by the tubing 28, vacuum conditions are readily developed within the pickup blade 14 for engaging and securing the object to the blade. With the valve unit 36 being biased into a closed position, it thus tends to assure that the object remains engaged by the instrument to prevent the object being dropped or otherwise accidentally disengaged.

From the construction of the instrument 10, positive but relatively light actuating pressure is applied to the lever portion 80 in order to open the vent 38 and destroy the vacuum conditions within the axially extending opening 32 and within the pickup blade 14. As noted above, the restrictive opening 76 serves to minimize evacuating air flow between the axially extending opening 32 and the vacuum source in order to more positively ensure termination of vacuum conditions within the pickup blade 14 for releasing relatively light objects and the like.

Thus, there has been described a particularly effective instrument and method of operation for vacuum handling of various objects, particularly relatively fragile objects such as semi-conductor wafers or chips. Various modifications in the construction and operation of the instrument, in addition to those described above are believed obvious. Accordingly, the scope of the present invention is defined only by the following appended claims.

What is claimed is:

1. In a hand held vacuum actuated pickup instrument, the combination comprising:

an elongated body, means arranged at one end of the body for receiving a vacuum pickup means, tail stock means arranged at an opposite end of the body for connection with a vacuum source, and valve means arranged within the elongated body, the valve means further comprising (a) a tubular element forming a passage extending axially through the body for communicating the pickup means with the tail stock means, (b) a vent opening being formed by the tubular element, the vent opening being of elongated configuration to facilitate more rapid venting of the axial passage by the valve member, (c) a spring-loaded valve member having a valve element overlying the vent opening, an exposed lever portion attached to one end of the valve element and fulcrum means providing for pivotal movement of the valve element by the lever portion, and (d) means for applying the spring load on the valve member normally biasing the valve element into closed engagement with the vent opening for producing a vacuum condition in the pickup means, the valve member being operable by the lever portion for selectively exposing the vent opening and terminating the vacuum condition in the axially extending passage and in the pickup means.

2. The vacuum actuated pickup instrument of claim 1 further comprising a sheath surrounding the tubular element of the elongated body, the sheath having an opening in which the valve lever portion is arranged for maintaining the valve member in place with its valve element overlying the vent opening, the spring loading for the valve member comprising a resilient compression spring member arranged between the tubular element and the lever portion.

3. The vacuum actuated pickup instrument of claim 2 wherein the sheath further comprises a vent opening while forming internal passages for communicating the vent opening in the sheath with the vent opening in the tubular element.

4. The vacuum actuated pickup instrument of claim 2 further comprising first and second collars threaded onto opposite ends of the tubular element for positioning the sheath.

5. The vacuum actuated pickup instrument of claim 4 further comprising adapter means positioned between the respective collars and adjacent ends of the sheath.

6. The vacuum actuated pickup instrument of claim 4 further comprising a retainer adapted for attachment to one of the collars for replaceably securing the pickup means on the instrument.

7. In a hand held vacuum actuated pickup instrument, the combination comprising:

an elongated body, vacuum actuated pickup means arranged at one end of the body, tail stock means arranged at an opposite end of the body for connection with a vacuum source, and valve means arranged within the elongated body, the valve means further comprising (a) a tubular element forming a passage extending axially through the body for communicating the pickup means with the tail stock means, (b) normally closed valve means being operable for opening an elongated vent to provide free air flow communication with the axially extending passage in the tubular element, and (c) means forming a restrictive opening between the axial passage and the tail stock means, the restrictive opening and vent being sized relative to each other for assuring termination of vacuum conditions in the pickup means upon operation of the valve means to vent the axial passage, the restrictive opening being sized to cause a delay in the rate at which pressure conditions in the pickup means are balanced with pressure conditions in the tail stock means.

8. The vacuum actuated pickup instrument of claim 7 wherein the means forming the restrictive opening is replaceably mounted on the elongated body to permit adjustment of the restrictive opening and thereby permit adaptation of the pickup instrument for different applications.

9. The vacuum actuated pickup instrument of claim 7 wherein the restrictive opening is variable in size.

10. The vacuum actuated pickup instrument of claim 7 wherein the normally closed valve means comprises a spring loaded valve member having a valve element overlying the vent, an exposed lever portion attached to one end of the valve element and fulcrum means provided for pivotal movement of the valve element by the lever portion.

11. The vacuum actuated pickup instrument of claim 10 wherein the spring loading for the valve member comprises a resilient compression spring member arranged between the tubular element and the lever portion.

* * * * *